United States Patent
Kronhamn et al.

(10) Patent No.: US 7,167,810 B2
(45) Date of Patent: Jan. 23, 2007

(54) ANALYTICAL ESTIMATION OF PERFORMANCE OF A SENSOR SYSTEM

(75) Inventors: Thomas Kronhamn, Hälsö (SE); Åke Andersson, Mölndal (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 178 days.

(21) Appl. No.: 10/485,806

(22) PCT Filed: Jul. 12, 2002

(86) PCT No.: PCT/SE02/01363

§ 371 (c)(1),
(2), (4) Date: Jun. 24, 2004

(87) PCT Pub. No.: WO03/014763

PCT Pub. Date: Feb. 20, 2003

(65) Prior Publication Data
US 2004/0243344 A1 Dec. 2, 2004

(30) Foreign Application Priority Data
Aug. 6, 2001 (SE) ................................. 0102666

(51) Int. Cl.
*G06F 19/00* (2006.01)
(52) U.S. Cl. ................... 702/182; 702/179; 342/165; 342/159
(58) Field of Classification Search ............... None
See application file for complete search history.

(56) References Cited

U.S. PATENT DOCUMENTS

| | | | |
|---|---|---|---|
| 5,661,666 A | | 8/1997 | Pawlak |
| 5,850,625 A * | | 12/1998 | Maren et al. ................. 702/93 |
| 6,801,878 B1 * | | 10/2004 | Hintz et al. ................. 702/188 |
| 6,882,959 B1 * | | 4/2005 | Rui et al. .................... 702/179 |
| 6,909,997 B1 * | | 6/2005 | Chen et al. .................. 702/189 |
| 6,944,566 B1 * | | 9/2005 | Chen et al. .................. 702/116 |
| 7,009,554 B1 * | | 3/2006 | Mookerjee et al. .......... 342/195 |
| 2002/0062193 A1 * | | 5/2002 | Lin .............................. 701/208 |
| 2002/0120374 A1 * | | 8/2002 | Douros et al. ................ 701/29 |
| 2003/0144795 A1 * | | 7/2003 | Lin .............................. 701/213 |
| 2003/0184468 A1 * | | 10/2003 | Chen et al. .................... 342/52 |

(Continued)

OTHER PUBLICATIONS

Andersson et al., "General Tracking Performance Description for Systems of Sensors", IEEE, Jul. 8-11, 2002.*

(Continued)

*Primary Examiner*—Patrick J Assouad
(74) *Attorney, Agent, or Firm*—Nixon & Vanderhye, P.C.

(57) ABSTRACT

The invention relates to a method for an analysis tool for analysis of the sensor performance of a system of sensors, which method comprises analytical calculation of a sensor system's measurement characteristics at each point in a given geographical area. The method comprises obtaining performance parameters from N sensors that are in the system. The method is characterized in that a set of analytical performance parameters for the system is calculated by the performance parameters being fused irrespective of the different measurement characteristics of the sensors in the system with regard to the given performance parameters and in that the analytical parameters are used in the analysis of the performance of the sensor system. The invention also relates to a device for use of the method and to the use of the method and the device.

15 Claims, 4 Drawing Sheets

U.S. PATENT DOCUMENTS

2003/0186663 A1* 10/2003 Chen et al. .............. 455/226.3
2003/0191610 A1* 10/2003 Chen et al. ................. 702/191
2005/0021201 A1* 1/2005 Klotz et al. ................... 701/35
2005/0073433 A1* 4/2005 Gunderson et al. ......... 340/903

OTHER PUBLICATIONS

Kronhamn, "Surveillance Performance", IEEE, 1995.*

Gan et al; "Comparison of Two Measurement Fusion Methods for Kalman-Filter-Based Multisensor Data Fusion. In:" IEEE Transactions on Aerospace and Electronics Systems, pp. 273-279, Jan. 2001, vol. 37, Issue I.

Okello et al; "Design of Data Fusion System for Multiradar Target Detection"; International Conference on Systems, Man and Cybernetics, 1993, Conference Proceedings, pp. 672-677, vol. 3, Oct. 17-20, 1993, le Touquet, France.

Paschall et al; "Design and Analysis of an Intergrated Targeting System"; Proceedings of the IEEE, 1994 National Aerospace and Electronics Conference, 1994, Naecon 1994, pp. 937-944, vol. 2, May 23-27, 1994, Dayton, OH, USA.

Chang et al; "Performance Evaluation of Multisensor Track-To-Track Fusion"; International Conference on Multisenor Fusion and Intergration for Intelligent Systems, 1996, pp. 627-632, Dec. 8-11, 1996, Washington, DC, USA.

Kronhamn T.R., "Surveillance Performance", Radar '95, IEEE International Radar Conference, 1995, Washington, USA.

"Comparison of the Measurement Fusion Methods for Kalman-Filter-Based Multisensor Data Fusion", IEEE Transactions on Aerospace and Electronic Systems, vol. 37, No. 1, Jan. 2001, pp. 273-280.

Kronhamn, "Target Range Estimation with Cooperating Airborne Passive Sensors", Radar 97, Publication No. 449, Oct. 14-16, 1997.

* cited by examiner

ANALYTICAL ESTIMATION OF PERFORMANCE OF A SENSOR SYSTEM

This application is the U.S. national phase of international application PCT/SE02/01363 filed in English on 12 Jul. 2002, which designated the U.S. PCT/SE02/01363 claims priority to SE application No. 0102666-5 filed 06 Aug. 2001. The entire contents of these applications are incorporated herein by reference.

TECHNICAL FIELD

A method for an analysis tool for analysis of sensor performance of a system of sensors, which method comprises analytical calculation of a sensor system's measurement characteristics at each point in a given geographical area. The method comprises obtaining performance parameters from $N_S$ sensors that are in the system. The invention also relates to a device for use of the method and to the use of the method and the device.

BACKGROUND ART

A sensor is a device that receives signals of various types, for example electromagnetic signals such as heat or radio signals, or signals such as sound waves. There are passive sensors that only receive signals, and active sensors that send out a signal that is reflected against an object and thereafter returns to the sensor where the signal is read off. An active sensor can calculate distance and bearing of an object, for example by measuring the time it takes for a pulse signal to return and by using a directional antenna. The passive or active sensor has predetermined specific characteristics.

A further type of sensor is an adaptive sensor, which can be caused to change its characteristics depending upon how an object behaves, for example to increase the sweep frequency or the intensity, over a particular area within the range of the sensor.

A radar is a typical sensor as above, intended to detect targets and track targets using electromagnetic waves. The following description of the background art refers principally to radar, but as other sensors can also be used, the term sensor is used instead of radar.

A sensor's measurement characteristics are often described as a number of performance parameters:

$p_{fa}$=the probability of false alarms per scan in a particular partial area, $p_{ss}$=detection probability per scan (the subscript ss refers to single scan) for targets with a particular target area, R=measurement accuracy, here expressed as a covariance matrix, and T=detection time for the sensors search area.

From these parameters the sensor's average measurement rate (or effective measurement rate), $$\frac{1}{T_e},$$

can be calculated as $$\frac{1}{T_e} = \frac{p_{ss}}{T}$$

The first three parameters, $p_{fa}$, $p_{ss}$ and R, often vary across the sensor's search area. The detection ability of the sensor can, for example, be given a value by calculating the distance from the sensor where the probability of detection is 0.5. This distance is often called $R_{50ss}$. By means of this value, the sensor's detection characteristics can be shown graphically by means of geometric figures in the form of circles or parts of circles where the value $R_{50ss}$ is scaled in such a way that the scaled value of $R_{50ss}$ constitutes the radius of the said figures, preferably together with a map of the area in question. The area that is described by the geometric figures is often called the sensor's range.

Certain existing planning tools (analysis tools) for sensors are based on ranges of the type described above and, in addition, can sometimes take into account topography and calculate restrictions in the range due to topographical masks by means of access to a map database.

A sensor's tracking characteristics can be described in a corresponding way as for the said detection characteristics, with a range $R_{50aq}$ given that a target approaches the sensor radially at a particular speed. This is described in Kronhamn T.R., "Surveillance Performance", Radar '95, IEEE International Radar Conference, 1995, Washington, USA.

Problems arise when the performance of a system of sensors is to be calculated. The difficulty consists of obtaining an idea of the system's characteristics, in particular with respect to the tracking, when the sensors have greatly varying characteristics, not only with regard to the ranges but also with regard to other characteristics such as measurement rate, measurement accuracy and false alarms.

For tracking of targets measured by a plurality of sensors, the filtering of target data is already known. The two most common techniques are:

1. The sensors track the target separately and the result is thereafter fused.
2. The measurements are fused and a tracking filter is thereafter used on the resulting measurement.

These methods relate to fusion of data in real systems, but can in principle also be applied for certain analysis analysis.

The filtering of target data according to point 1 comprises the calculation of a tracking filter, often a Kalman filter, for each sensor. For fusion of these values, the values in the filter's covariance matrix are to be fused, which involves laborious calculations that require a lot of data capacity and take a long time. A further problem is that in fusion of tracking data, the degree of correlation between the estimates is not known, which is not possible to calculate in real systems. In an analysis it should, however, be possible to calculate the correlations, but these calculations would add to the already laborious calculations.

In filtering target data according to point 2, a plurality of variants can arise, two of which variants (2a and 2b) will be illustrated in greater detail below. This is also described in Gan Q., Harris J.C., "Comparison of Two Measurement Fusion Methods for Kalman-filter Based Multisensor Data Fusion", IEEE Trans on AES, Vol. 37, No. 1, pp 273–280, January 2001.

For fusion according to 2a, the fusion consists in the actual case of the measurement data being processed in the chronological order in which they are received, that is the contributions from the different sensors are received at different times and are processed by a common filter. This is, however, not applicable in the analytical case in which an evaluation of a system's performance is to be carried out. Actual measurement values are then not available, but only the general characteristics of the measurement values as described above. A fusion of these characteristics is to be carried out, but there are problems relating to randomness.

For fusion according to 2b, the measurements are fused before they are passed through a tracking filter. This can be carried out in two ways (2b1 and 2b2). In order to be able to utilise a filter according to 2b1, simultaneity is required for the measurements that are being fused. By simultaneity is meant here that the measurements are carried out at the same moment for all the sensors in the system and that there are no deviations in the measurement rate, detection characteristics or angle or distance to the measurement object. For use of a filter according to point 2b2 above, the measurements for the different sensors are weighted, fused, using known mathematical methods in which the accuracy of the weighted values, that is the variance, is calculated according to the equation (7-1) below.

$$R_j = \left\{ \sum_{i=1}^{N_S} R_i^{-1} \right\}^{-1} \quad (7\text{-}1)$$

This equation applies, however, only if the simultaneity described above is fulfilled, which in practice means that there are no deviations in measurement rate, detection characteristics or angle or distance to the measurement object. The probability of these criteria being fulfilled for a system of sensors that are tracking a mobile measurement object is very small, almost non-existent.

For fusion according to 2b2, the measurement vector is increased, instead of the measurement values being weighted and combined. In this case, the measurement contributions of the different sensors are added to a vector in sequence, with the result that a large measurement matrix is obtained which gives intensive calculations for calculating the tracking filter. In order to illustrate the problem, it can be mentioned that a measurement vector with n elements gives rise to a covariance matrix of $n^2$ elements. Simultaneity is also required in the 2b2 case, with the problems mentioned above in the discussion concerning 2b1.

Some further disadvantages of existing technology are that only an idea of the measurement characteristics of the sensor(s) is obtained in the form of range and measurement accuracy. This is often combined with map databases in order to give an idea of the range of the sensor system, in the form of topographical masks and the like. These methods do not give performance for the sensor system as a whole, for example in the form of which tracking characteristics these measurement characteristics can be expected to provide.

There is a requirement to be able to carry out an analysis of sensor performance for a system of sensors, for planning the positioning of sensors in a particular area to be monitored. Sensor performance is normally calculated and described during design and purchasing. There is in addition an increasing need:

to evaluate necessary sensor resources (or alternatively, how existing resources are best to be utilised), in planning an assignment in which sensors are to be used, to match the sensor resources to the situation in question in real time; so called reactive searching, to evaluate the effect of possible or proposed measures/ changes for adaptive sensors, both as automatic and manual "decision supports".

Further disadvantages of previously known technology are that the requirements that are described above cannot be fulfilled by previously known analysis methods.

BRIEF SUMMARY

The invention aims to solve the problems/disadvantages that are described above and aims to provide an analysis tool for analysis of sensor performance in a system of sensors. The invention thus solves among other things the problem of "calculating analytically" the system's performance parameters, analytical performance parameters, that can provide measurement characteristics and tracking performance at each point in a given geographical area for a system of sensors, that is when several sensors "measure" the same target. A typical sensor in a sensor system of the above mentioned type is a radar, but the use of the method according to the invention for calculating analytical performance parameters for a sensor system can also be used for other types of sensor. The term sensor will therefore be used in the following instead of the term radar.

By "calculating analytically" is meant calculating expected performance using mathematical methods on the basis of known characteristics of the sensors and the measurement objects, in contrast to calculating the performance of a real system in a situation where actual measurements are carried out. In cases where there are random phenomena, firstly effective values for characteristics/performance and secondly spread measurements for variations around the effective values are calculated analytically. The effective value is calculated using formulae which are presented in the following text, where the subscript "e" stands for the effective parameter.

The problem of sensor systems according to previously known technology consists partly of the fact that the sensors can have varying measurement characteristics, and partly of calculating tracking performance not only for a given target path, but also calculating performance over the surface (volume) that the sensor system is to monitor.

The invention thus comprises a method for an analysis tool for analysis of sensor performance for a system of sensors, which method comprises analytical calculation of a sensor system's measurement characteristics at each point (for the purposes of calculation, however, a raster of points is selected in practice) in a given geographical area. The method comprises obtaining performance parameters from $N_s$ sensors that are in the system. The method is characterized in that:

a set of analytical performance parameters for the system is calculated by the performance parameters being fused irrespective of the different measurement characteristics of the sensors in the system with regard to the given performance parameters and in that:

the analytical parameters are used in the analysis of the performance of the sensor system.

Obtaining performance parameters comprises obtaining performance parameters comprising:

$p_{ss,i}$=detection probability per scan (the subscript ss refers to single scan) at a particular point for targets with a particular target area for the sensor $N_s$=i;

$R_i$=measurement accuracy expressed as a covariance matrix for the sensor $N_s$=i;

$T_i$=detection time for the search area of the sensor $N_s$=i, and $p_{fa,i}$=the probability of false alarms for a sensor $N_s$=i.

The calculation of the analytical performance parameters comprises calculations based on selected performance parameters, which calculations comprise the formulae:

$$T_j = \left( \sum_{i=1}^{N_S} T_i^{-1} \right)^{-1} \quad (7\text{-}2)$$

$$\frac{1}{T_{ej}} = \sum_{i=1}^{N_S} \frac{p_{ss,i}}{T_i} \quad (7\text{-}3)$$

$$p_{ss,j} = \frac{T_j}{T_{ej}}, \quad (7\text{-}4)$$

$$\frac{1}{T_{ei}} = \frac{p_{ss,i}}{T_i} \quad (7\text{-}5)$$

$$\mu_i = \frac{T_{ej}}{T_{ei}} \quad (7\text{-}6)$$

$$R_j = \left\{ \sum_{i=1}^{N_S} \mu_i R_i^{-1} \right\}^{-1} \quad (7\text{-}7)$$

$$p_{fa,j} = \left\{ \sum_{i=1}^{N_S} \frac{p_{fa,i}}{T_i} \right\} T_j \quad (7\text{-}8)$$

where $$T_j, \frac{1}{T_{ej}},$$

$p_{ss,j}$, $\mu_i$, $R_j$ and $p_{fa,j}$ are the analytical performance parameters, where $N_s$ stands for the number of sensors in the system and where the subscript j stands for "joint", that is resulting.

The measurement error covariances are described here in a common Cartesian coordinate system. The resulting first covariance matrix, $R_j$, for measurement errors for the sensor system is calculated using a method that differs from known methods, with the difference that according to the invention the contribution of the individual sensors is to be weighted by $\mu_i$, see equation (7-6).

The analytical parameter $\mu_i$ refers to a weighting measurement for the contribution to the system of each sensor in the system, consisting of the effective measurement rate, $$\frac{1}{T_{ei}},$$

for the sensor $N_s$=i, being divided by the analytical parameter "effective measurement rate for the system"

$$\frac{1}{T_{ej}}.$$

The weighting by $\mu_i$ means that the calculations of the analytical performance parameters for the system are independent of the actual variations in the measurement processes of the sensors in the system, for example $p_{ss,i}$ which is the detection probability per scan for targets with a particular target area for the sensor $N_s$=i, the measurement rate $$\frac{1}{T_i}$$

or the actual geometric relationship of the measurement object to the respective sensor. This means that the invention has solved the problem of analytically calculating performance for a system of sensors with different measurement characteristics with regard to the given performance parameters. The sensor system can thus be regarded as one sensor for specified analytical purposes.

In the description of previously known technology, it was mentioned that fusion of the measurements according to 2b and equation (7-1) are applicable provided that the conditions for simultaneity are fulfilled, which is itself unrealistic, for which reason such methods are not applicable for calculating the performance of the sensor system according to the invention. According to the above, $\mu_i$ is used in the equation (7—7) in order to weight the contribution of the sensors and make possible fusion and calculation of the performance of a sensor system. When there is simultaneity, in certain cases, $\mu_i$=1 and the equation (7-1) will be applicable, however it should be added that the equation (7-1) can only be used when there are no deviations between the sensors in measurement rate, detection characteristics or angle or distance to the measurement object. The only way to achieve this in the case of a target that is in the vicinity of the sensors is to put the sensors at the same point with the same performance, which in principle involves the use of one sensor.

Irrespective of the position or performance of the sensors it is possible to combine the senors' measurement values by each sensor's detection time, $T_i$, being divided up into $N_S$ equal time components which spread the measurement equally, which means that the measurment values are combined at the common created moments of time for the time components. In this way, an average is obtained for the behavior of each sensor, with an increase in the variance of $N_S$ in size as a result. By means of the said method, the problem of simultaneity and synchronisation is avoided.

The measurement characteristics of the sensor system are estimated by reading off all the analytical performance parameters calculated for the system, $$T_j, \frac{1}{T_{ej}},$$

$p_{ss,j}$, $\mu_i$, $R_j$ and $p_{fa,j}$. It can be mentioned that through its different elements in the matrix, the covariance matrix, $R_j$, corresponds to the measurement error in, for example, the position of a target or measurement object, in relation to a selected system. Such a selected system is preferably a Cartesian coordinate system, but can also be another system that is suitable for the purpose.

The analytical parameter $p_{ss,j}$=detection probability per scan for targets with a particular target area at a particular point in the sensor system.

The the technology also comprises a method for calculating tracking performance for the sensor system, both for given target paths and also generally over the whole given area. The calculation described above of the tracking performance for a sensor is already known, but it has not previously been possible to calculate the tracking performance for a system of sensors analytically, unless the simultaneity condition was fulfilled. The technology can be used to calculate either the system's "stationary" characteristics or the system's "dynamic" characteristics using the said formulae.

By the system's "stationary" characteristics is meant that a filter's stationary state is calculated at each point over the area, that is identical measurements are carried out over a period of time until a fictitious stationary state, a quasi-stationary state, is attained at the point in question.

By the system's "dynamic" characteristics is meant the system's characteristics given particular target speed and target course. The system's dynamic characteristics are obtained by parallel target paths being generated over the area and a filter being applied to these target paths. The said filter can be dimensioned according to various forecasts concerning the manoeuvring characteristics of the target in order to illustrate the system's ability to track under the prevailing conditions. A suitable filter for the invention is a Kalman filter, but there can be other filters that are suitable for the invention.

The said formulae are used for calculating the measurement characteristics of the sensor system and the analytical performance parameters are used for calculating tracking performance for the sensor system in order to calculate with a filter the sensor system's tracking performance for tracking measured objects. The filter for the system gives a second covariant matrix, P, which is read off as a covariance matrix that indicates the sensor system's tracking accuracy at each point in a given area. The elements in the said second covariance matrix, P, refer to variances, for example variances of positions, speeds and accelerations.

Based on the results that are obtained by means of the tracking performance described above, a number of characteristics for the system can now be described, such as, for example, tracking accuracy, risks of conflict with other targets or false alarms, the number of targets that can be tracked, etc.

A great advantage of the method of analytically calculating tracking performance for a sensor system according to the above, is that the sensor system's measurement characteristics are defined at each point in the space. The tracking characteristics for the system can thereby be calculated by using only one tracking filter for the sensor system, which differs from previously known technology in which a filter for each sensor is used. As the measurement characteristics of the sensors are ideally stored together (all the measurements are used) an idea is also obtained in this way of the possible performance of the sensor system.

By means of the description of the sensor system's measurement characteristics as above, it is possible to calculate probabilities for various events that affect the tracking procedure by the utilisation of a calculated measurement rate, $$\frac{1}{T_j},$$

the detection probability, $p_{ss,j}$ and the probability of false alarms $p_{fa,j}$, for the sensor system together with Markov analysis. The calculated measurement rate, $$\frac{1}{T_j},$$

consists of the reciprocal value of the analytical parameter, $T_j$, which refers to the searching time for the search area of the sensor system at a particular given point. This method can be used to determine the detection range, that is where along a particular target path the target is detected for the first time. When tracking a target, it is also important to know the detection criterion in order to know when tracking is to commence. The detection criterion gives an acceptable level for the number of detections per number of attempts to detect a target. In this connection, it is also interesting to know the capturing range, that is where in the target path the capturing criterion is fulfilled, and corresponding termination criteria, that is where and when the tracking is terminated. All these cases can be evaluated analytically on the basis of the method, utilising the measurement rate for the system, the detection probability and the probability of false alarms for the system together with Markov analysis, according to the above.

As mentioned above, it is also possible to utilise the sensor system's measurement characteristics in calculating a filter for the tracking characteristics of the sensor system. For calculating a filter for tracking characteristics, the calculated effective measurement rate $$\frac{1}{T_{je}},$$

for the system is utilised, which effective measurement rate is a form of averaging of the measurement rates of the sensors in the system according to the formula (7-3). The detection probability, $P_{j,ss}$, then becomes equal to 1 for the system. The effective measurement rate is used to eliminate random errors in the system, that is differences in measurement rate, detection characteristics (detection probability, etc) or angle or distance to the measurement object.

The tracking characteristics are then calculated on the basis of these measurement characteristics for the system of sensors. This can be carried out both for given target paths and also for describing characteristics within a particular area (or volume).

The tracking performance of the sensor system can be calculated for a given target path. The covariance matrix for the prediction error (error in forecast) of a filter, for example a Kalman filter, can also be used to evaluate the risk of tracking being confused with false alarms or other targets. In order to describe the sensor system's tracking characteristics in an area, the following steps are carried out;

1. A user can either choose to calculate tracking characteristics for a particular target path direction or to calculate the tracking characteristics using the previously described quasi-stationary state. For certain target paths, targets are generated on straight paths, at particular intervals, from a selected direction. For these target paths, the tracking characteristics are calculated that are intended to be illustrated. Methods for carrying this out can be read in Conference, 1995, Washington, USA. Certain tracking characteristics are dependent upon the direction of the target path in relation to the measuring sensors.

2. Dependent upon the requirements and/or the application, the tracking characteristics can now be selected to be represented by three-dimensional graphs (where the height coordinate represents the value of the characteristic) of the selected area, with "level curves" marking the areas where the characteristics fulfill certain conditions or with a single numeric value by the characteristics being integrated over the selected area.

For adaptive sensors, the measurement rate is not known in advance, but depends upon the number of targets and upon how the sensor's time is divided between different tasks, for example the sensor's search frequency can be changed. According to the invention, a system of such sensors, or system of sensors in which such sensors are included, can be analysed/described as follows:

1. Measurements of the search function and tracking function are defined as separate "sensors", as above, and they are combined according to the technique described above according to the invention. As an example, it can be mentioned that more sensor resources can be applied to already established targets, which in itself involves control of the sensor's resources depending upon requirement.

2. In addition, each adaptive sensor is described by a function for determining how the sensor's resources are to be used and for ensuring that the two "sensor models" according to point 1) are connected in the sense that they share the sensor's resources.

3. A sensor system's combined adaptive capabilities can be analysed by the system's measurement characteristics being determined in the way that was described above. In the same way as for a single adaptive sensor, the effects of a selected distribution between the sensor system' s searching and tracking "task" can now be shown. In addition, it can, hereby be shown how the resources can be divided between the sensors in a suitabale way. This is made possible by invention making possible a simple calculation of the characteristics of the whole sensor system, which is what is to be optimised.

4. The technology is particularly suitable for showing the performance of an adaptive sensor system, given that certain target paths are generated.

The technology can also be used for showing the effects of all targets in an area being given a particular tracking quality, given that a particular target density is specified.

For so-called passive sensors, where the target's distance cannot be measured, the procedure is carried out in a corresponding way to that described above. For calculating the performance for given target paths, the known position of the target is used. For calculating the general characteristics of the sensor system, the measurement characteristics are determined, as described above, at a number of points in the area. The difference from the case with the active sensor is that in unfavourable geometries the description of measurement errors by a covariance matrix as above is not sufficient. The invention is thereby well suited for use of techniques described in Kronhamn T.R. "Target Range Estimation with Cooperating Airborne Passive Sensors", Radar '97, IEEE. International Radar Conference, Edinburgh UK, 1997, with, for example, multiple Kalman filters or extended Kalman filters.

As an example of the advantages of the technology, it can be mentioned that a management centre can continually make forecasts of a sensor system's performance and respond to queries such as, for example, "What happens to the system's performance if we move a sensor from one position to another?" or "Which sensor resources are required at a particular position within the range of the system in order for the system to have a sufficiently high capacity at the given location?".

DESCRIPTION OF DRAWINGS

The invention will be described below in greater detail, using examples of embodiments and with reference to the attached drawings, in which:

FIG. 1 shows a flow chart for a method according to an example embodiment. The method is intended to be used with an analysis tool for analysis of sensor performance for a system of sensors. The method is preferably intended to be used for radar, but can also be used for other types of sensors, for which reason the more general term "sensor" has been selected in the following text. The method comprises analytical calculation of a sensor system's measurement characteristics at each point in a given geographical area, which method comprises:

obtaining performance parameters 1, 2, 3 from $N_S$ sensors that are in the system. In order to facilitate the description, FIG. 1 shows performance parameters 1, 2, 3 being obtained from three sensors 11, 12, 13 that are in the system, but the system is, of course, not limited to this number of sensors. The method is characterized in that:

Figure 1:
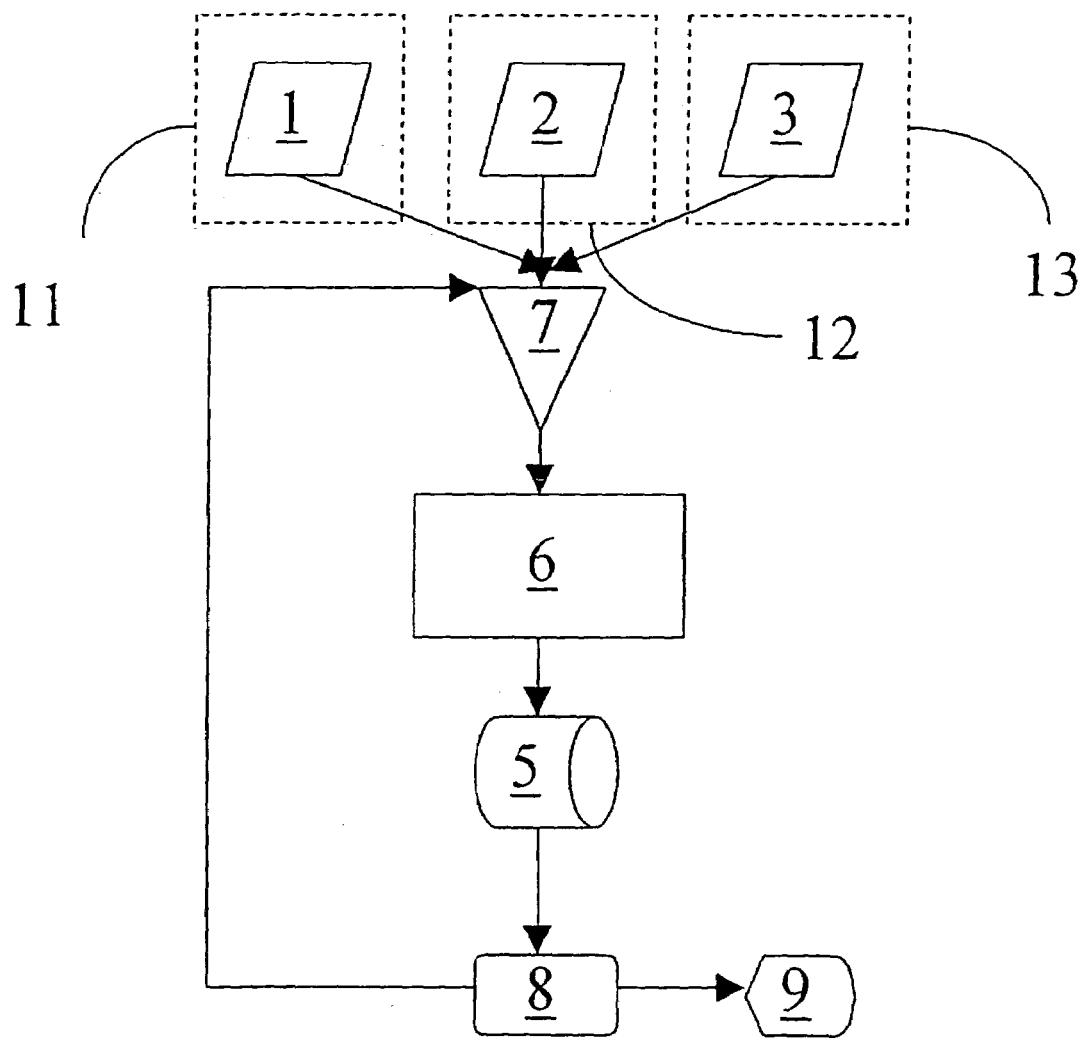
FIG. 1 shows a flow chart of a method according to an example embodiment.

a set of analytical performance parameters (represent by block 5) for the system is calculated (as shown by block 6) by the performance parameters 1, 2, 3, being fused (as shown by block 7) irrespective of the different measurement characteristics of the sensors in the system with regard to the given performance parameters and in that:

the analytical parameters are used for analysis (as shown by block 8) of the sensor system's performance.

An additional advantage of the method according to the technology using fusion of performance parameters as above for calculating analytical performance parameter for a system is obtained with adaptive sensors, each of which can be regarded as a sensor system. An adaptive sensor can thus be regarded as several different sensors, depending upon how the adaptive sensor is adjusted.

The result from the analysis of block 8 is presented (as depicted by block 9) to a user in a suitable way, for example via a display or a printout. The analysis depends, in addition, on which type of analysis the user requires. A couple of different analyses will be discussed in greater detail below.

By "being fused" is meant the combining of the performance parameters 1, 2, 3, of the respective sensors by means of calculations.

The performance parameters 1, 2, 3, each comprise:

$p_{ss,i}$=detection probability per scan for targets with a particular target area for the sensor $N_s$=i;

$R_i$=measurement accuracy expressed as covariance matrix for the sensor $N_s$=i;

$T_i$=searching time for the search area for the sensor $N_s$=i, and:

$p_{fa,i}$=the probability of false alarms for a sensor.

The calculation of the analytical performance parameters 5 comprises calculations on the basis of the performance parameters 1, 2, 3, which calculations fuse the performance parameters 1, 2, 3, by use of the formulae:

$$T_j = \left(\sum_{i=1}^{N_S} T_i^{-1}\right)^{-1} \quad (7\text{-}2)$$

$$\frac{1}{T_{ej}} = \sum_{i=1}^{N_S} \frac{p_{ss,i}}{T_i} \quad (7\text{-}3)$$

$$p_{ss,j} = \frac{T_j}{T_{ej}}, \quad (7\text{-}4)$$

$$\frac{1}{T_{ei}} = \frac{p_{ss,i}}{T_i} \quad (7\text{-}5)$$

$$\mu_i = \frac{T_{ej}}{T_{ei}} \quad (7\text{-}6)$$

$$R_j = \left\{\sum_{i=1}^{N_S} \mu_i R_i^{-1}\right\}^{-1} \quad (7\text{-}7)$$

$$p_{fa,j} = \left\{\sum_{i=1}^{N_S} \frac{p_{fa,i}}{T_i}\right\} T_j \quad (7\text{-}8)$$

where $$T_j, \frac{1}{T_{ej}},$$

$p_{ss,j}$, $\mu_i$, $R_j$ and $p_{fa,j}$ comprise the analytical performance parameters, where $N_s$ stands for the number of sensors in the system (here $N_s$=3) and where the subscript j stands for "joint", that is resulting.

The analytical parameters can be used for analysis of probabilities for different events that concern the tracking procedure and are calculated by using a calculated measurement rate, $$\frac{1}{T_j},$$

the detection probability, $p_{ss,j}$ and the probability of false alarms, $p_{fa,j}$, for the sensor system together with Markov analysis.

The analytical parameters can be used for analysis of the system's tracking characteristics by a filter for the sensor system being calculated by using the calculated effective measurement rate, $$\frac{1}{T_{ej}},$$

for the system.

The said formulae are used to calculate the sensor system's measurement characteristics in order to calculate with a filter the sensor system's tracking performance for tracking measured objects, and in order that the filter for the system gives a covariant matrix, P, which is read off as a covariance matrix that gives the tracking accuracy of the sensor system at each point in a given area.

Further analysis of the sensor system can be carried out by the sensor system's stationary characteristics being calculated by a filter's stationary state being calculated at each point over a given area, which calculation comprises the said formulae.

Further analysis of the sensor system can be carried out by the sensor system's dynamic characteristics being calculated by a filter being calculated based on parallel target paths of a target with given values of speed and course, which calculation also comprises the said formulae.

An additional advantage of the method according to the technology using fusion of performance parameters as above for calculating analytical performance parameters for a system is obtained with adaptive sensors, each of which can be regarded as a sensor system. An adaptive sensor can thus be regarded as several different sensors, depending upon how the adaptive sensor is adjusted.

The method for an analysis tool according to the above is used preferably by a device for analytical calculation of the sensor system's performance. Such a device can be, for example, a computer, which is also used to display the sensor system's performance graphically to a user of the analysis tool with regard to required information, for example the system's detection and tracking probabilities.

Figure 2:
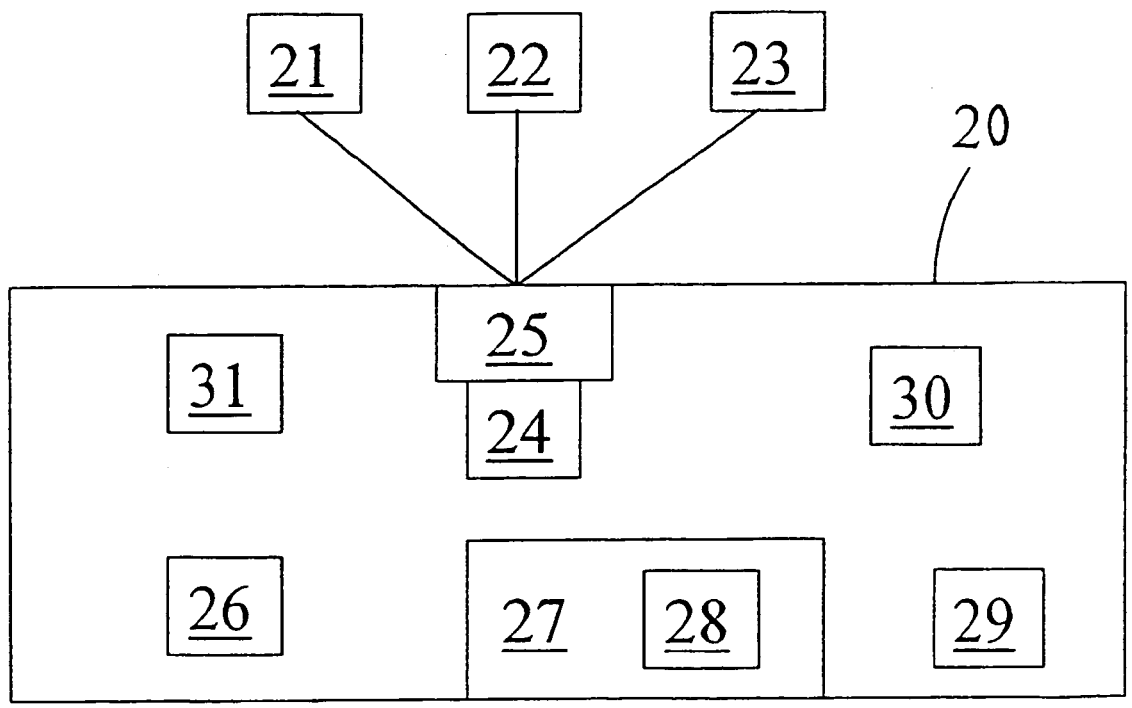
FIG. 2 shows a device for the use of a method according to an example embobiment.

FIG. 2 shows a device 20 for use of a method according to an example embodiment, where the sensor system comprises three sensors, 21, 22, 23, and the device comprises means 24 for combining performance parameters in the form of measurement characteristics from the respective said sensors 21, 22, 23. In order for the performance parameters to be able to be transmitted from the respective sensor to the device 20, a means 25 is used that is suitable for the purpose, for example an interface, that is a device that converts signals, for example from analog to digital, in order to make possible digital data processing. The means 25 can also consist of a device that is used as a summation point of digital signals.

All the means mentioned in the text refer to devices suitable for the purpose, for example an additional computer unit, an interface or a suitable algorithm in an existing computer.

The device also comprises means 26 for fusion of the performance parameters by weighting the measurement contributions of the respective said sensors 21, 22, 23, which device comprises means 27 for calculating analytical performance parameters for the sensor system, which means 27 for calculating analytical performance parameters for the system is independent of the different measurement values of the sensors in the system, for example random variations and different measurement rates, on account of the weighting of the respective said sensors' measurement contribution. The means 27 for calculating analytical performance parameters for the sensor system comprises, among other things, means 28 for calculating a covariance matrix.

The device comprises means 29 for calculating a filter's stationary state at each point over a given area.

The device comprises means 30 for calculating a filter's dynamic characteristics on the basis of parallel target paths for a target with given values of speed and course.

The device also comprises means 31 for presentation of analysis results to a user. Such a means 31 can, for example, be a display or a printer.

According to an example embodiment, at least one of the sensors in the sensor system is a passive sensor.

According to a second example embodiment, at least one of the sensors in the sensor system is an active sensor.

According to yet another example embodiment, at least one of the sensors in the sensor system is an adaptive sensor.

According to yet another example embodiment, at least one of the sensors in the sensor system is a radar unit.

In order to illustrate further the advantages of the present technology, an example will be given below of how the analysis tool increases a user's ability to analyse the system's performance. The example concerns the analysis of a target path and is illustrated with reference to FIGS. 3 and 4.

Figure 3:
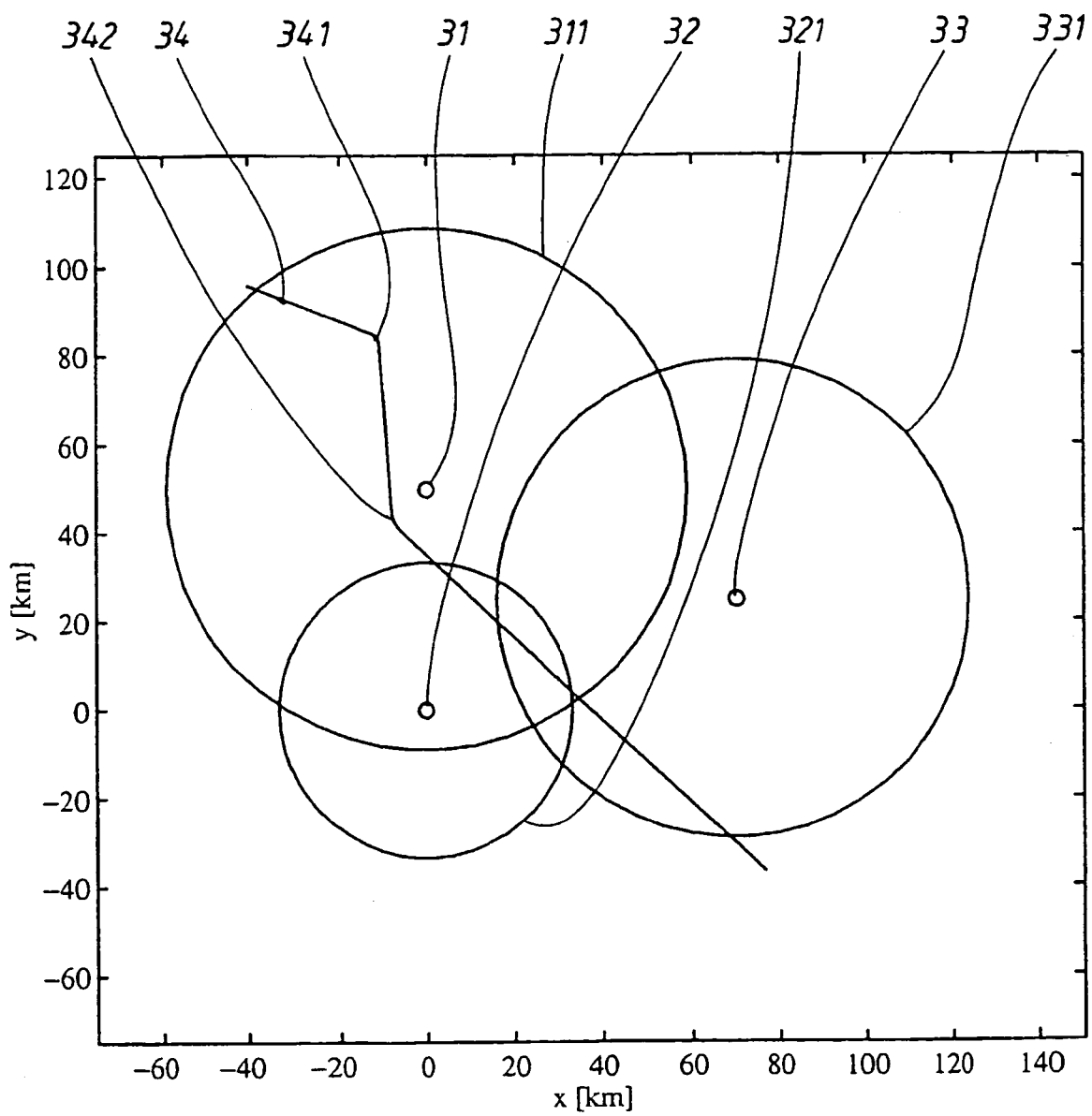
FIG. 3 shows a sketch of range and target path according to previously known technology for an exemplary sensor system comprising three sensors, i=1,2,3, with different measurement rates.

FIG. 3 shows a sketch of the range and target path according to previously known technology for a sensor system comprising three sensors, i=1,2,3, with different measurement rates. In this case, the sensors concern three radar units that sweep 360 degrees, that is a complete revolution per sweep, which means that the searching time, $T_i$, for the search area of the sensor N=1 concerns a complete revolution. Another way of indicating how a radar sweeps is to specify the measurement rate, which means the reciprocal value of the time between the measurements, that is $$\frac{1}{T_i}.$$

FIG. 3 shows a coordinate system for an area of X km (the x-axis in the sketch) and Y km (the y-axis in the sketch). The figure shows a first sensor 31, a second sensor 32 and a third sensor 33. The origin in the coordinate system has been placed in the centre of the second sensor 32. The figure also shows the probabilities for detection of a target with one measurement (one sweep) by circles 311, 321, 331 having been drawn for the sensors 31, 32, 33 respectively, marking the border of a 50% probability of detecting the target with one measurement, that is the circles show $R_{50ss}$. The first sensor 31 has a searching time $T_1$=5s, the second sensor 32 has a searching time $T_2$=1s and the third sensor 33 has a searching time $T_3$=2s.

FIG. 3 also shows a target path 34 for a target with a particular target area and with a constant speed of 250 m/s. The target path consists of a continuous line consisting of three straight paths with three target manoeuvres in between. The first target manoeuvre 341 is carried out between the times t=110s and t=120s at 3 g and the second manoeuvre 342 is carried out between the times t=260s and t=280s at 1 g.

FIG. 3 shows principally how a sensor system's performance is evaluated using previously known technology, in which the different circles 311, 321, 331 that indicate $R_{50ss}$ have been drawn and an interpretation of the range is carried out on the basis of the geographical extent of the circles.

Figure 4:
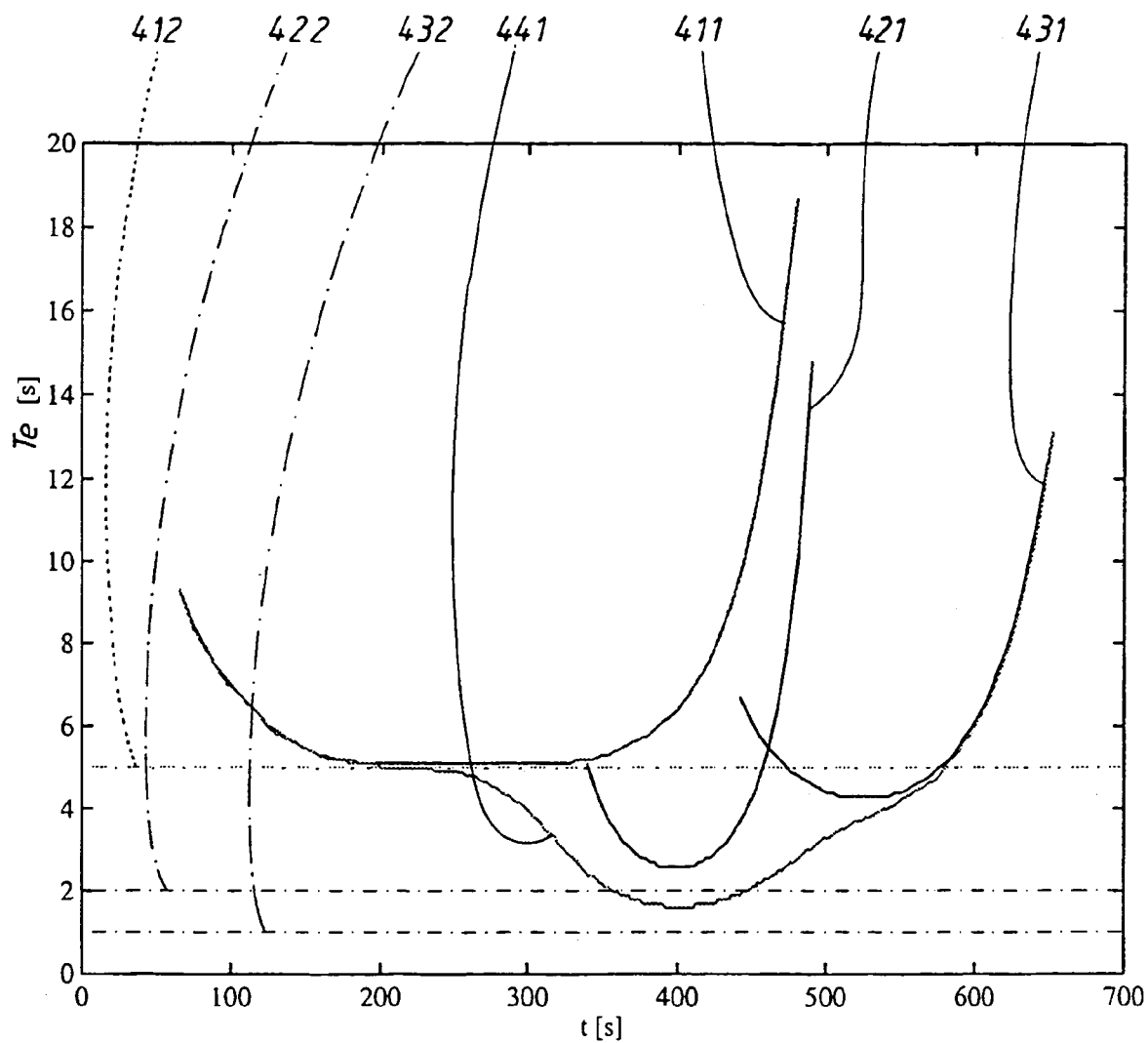
FIG. 4 shows a diagram of effective searching times, $T_{ei}$, for three individual sensors according to FIG. 3, and effective searching times, $T_{ej}$, for the sensor system at different times for a target defined in the sensor area.

FIG. 4 shows a diagram of effective searching times, $T_{e1}$, 411, $T_{e2}$, 421, $T_{e3}$, 431, for the three individual sensors 31, 32, 33 respectively according to FIG. 3, and for the sensor system's effective searching times, $T_{ej}$, 441, at different times for a target defined in the sensor area. The effective searching times, $T_{ei}$, are calculated as $$\frac{T_i}{p_{ss,i}}.$$

The searching time $T_e$[s] is shown on the y-axis and the target path's time t [s] is shown on the x-axis. FIG. 4 also shows three parallel broken lines 412, 422, 432 that indicate the respective effective searching times, $T_{e1}$, 411, $T_{e2}$, 421, $T_{e3}$, 431, when the detection probability for each sensor, $p_{ss,i}$ is equal to one, that is the broken parallel lines 412, 422, 432 indicate the searching time of the respective sensor.

FIG. 4 shows clearly how the individual sensors' effective searching times, $T_{e1}$, 411, $T_{e2}$, 421 and $T_{e3}$, 431 differ from the sensor system's effective searching times, $T_{ej}$, 441. As the effective searching time is dependent upon the reciprocal value of the detection probability, the diagram is to be interpreted as showing that a high value on the y-axis means a low detection probability. The detection probability diminishes with the distance from the centre of the sensor, which can be seen, for example, at t=280 (the second target manoeuvre 342 in FIG. 3) where the first sensor's 31 effective searching time, $T_{e1}$, 411 lies close to the parallel line 412, which marks a detection probability close to one for the first sensor, and where the second sensor's 32 effective searching time, $T_{e2}$, 421 approaches infinity (not shown, however, in the figure, but only a sharply rising curve that ends at approximately 330s) in relation to the parallel line 422, which marks a detection probability approaching zero for the second sensor, and where the third sensor's 33 effective searching time, $T_{e3}$, 431 approaches infinity (not shown, however, in the figure, but only a sharply rising curve that ends at approximately 430s) in relation to the parallel line 432, which marks a detection probability approaching zero for the third sensor. The detection probability is, as mentioned previously, a measurement of the probability of detecting a target with a given target area and distance by a "single scan", that is by one scan. FIG. 3 shows that the second target manoeuvre 342 is carried out outside the circles 321, 331 for the ranges for the second and third sensors 32, 33 respectively, and that the manoeuvre is carried out within the circle 31 for the range for the first sensor. FIG. 4 also shows that for the second target manoeuvre 342 in FIG. 3 the sensor system's effective searching times, $T_{ej}$, 441 are approximately the same as for the first sensor's 31 effective. searching times, $T_{e1}$, 411, but it should be mentioned, however, that the sensor system's effective searching times, $T_{ej}$, 441 are always strictly less than the effective searching times for the sensor that is located closest in effective searching times.

At a second point in FIG. 4, for example at t=400, it can be seen that the first sensor's 31 effective searching times, $T_{e1}$, 411 and the third sensor's 33 effective searching time, $T_{e3}$, 431 increase and approach infinity respectively, but that the second sensor's 32 effective searching time, $T_{e2}$, 421 approaches its minimum, which is a consequence of the target's distance from the respective sensor. The second sensor's 32 effective searching time, $T_{e2}$, 421 has its minimum at a distance from the parallel line 422, which is a consequence of the target's distance from the second sensor 32.

The sensor system's effective searching time, $T_{ej}$, 441 at t=400 differs, however, from the second sensor's 32 effective searching time, $T_{e2}$, 421, and is, in addition, lower. As the sensor system's effective searching time, $T_{ej}$, 441 at t=400 is lower than the second sensor's 32 effective searching time, $T_{e2}$, 421, the sensor system's detection probability, $p_{ss,j}$, is higher than that of the closest sensor, which is the second sensor 32. Thus the sensor system has an equally good or better effective searching time than the individual sensors in the system, that is equally good or higher detection probability.

The knowledge that the sensor system has better performance than the individual sensors at certain points is important information for a user of the system. It can, for example, be used when planning where the sensors are to be set up in order to cover as large a surface as possible with regard to the detection probability, or where the sensors are to be set up in order to concentrate on meeting certain requirements, for example by increasing the detection probability in a particular geographical section by the use of the synergy effects that arise when the sensor's ranges overlap each other.

Further analyses of a target path can be carried out on the basis of the analytical parameters calculated using the method, for example tracking accuracies can be calculated for individual sensors and for the sensor system respectively, and tracking probabilities for the target in question for individual sensors and for the system respectively.

Further analyses can, of course, be carried out over an area of the sensor system, for example risks of target confusion in association slots can be obtained with varying filter dimensioning. Association slots relate to the volume that applies for a target. In addition, the tracking probabilities over the surface can be calculated analytically on the basis of the analytical parameters.

The invention is not to be regarded as being restricted by the embodiments and examples described, but can occur in additional embodiments within the framework of the patent claims, for example the invention can be used for sensors that are not of electromagnetic nature. Examples of such sensors are sonars, which sensors are based on sound waves.

The invention claimed is:

1. A method for analyzing performance of a system of sensors, which method comprises analytical calculation of a sensor system's measurement characteristics at each point in a given geographical area, the method comprising:
   obtaining performance parameters from $N_S$ sensors that are in the system, the performance parameters comprising:
   $p_{ss,j}$=a detection probability per scan for targets with a particular target area for the sensor $N_S$=i;
   $R_j$=measurement accuracy expressed as a covariance matrix for the sensor $N_S$=i;
   $T_j$=searching time for a search area for the sensor $N_S$=i, and;
   $P_{fa,j}$=a probability of false alarms for a sensor $N_S$=i;
   calculating a set of analytical performance parameters for the system using the performance paramaeters being fused, the calculating of the analytical performance parameters being performed irrespective of different measurement charictaristics of the sensor in the system, the calculating of the analytical performance parameters including evaluating the following expressions:

$$T_j = \left(\sum_{i=1}^{N_S} T_i^{-1}\right)^{-1} \quad (7\text{-}2)$$

$$\frac{1}{T_{e,j}} = \sum_{i=1}^{N_S} \frac{p_{ss,i}}{T_i} \quad (7\text{-}3)$$

$$p_{ss,j} = \frac{T_j}{T_{e,j}}, \quad (7\text{-}4)$$

$$\frac{1}{T_{ei}} = \frac{p_{ss,i}}{T_i} \quad (7\text{-}5)$$

$$\mu_i = \frac{T_{ej}}{T_{ei}} \quad (7\text{-}6)$$

$$R_j = \left\{\sum_{i=1}^{N_S} \mu_i R_i^{-1}\right\}^{-1} \quad (7\text{-}7)$$

$$p_{fa,j} = \left\{\sum_{i=1}^{N_S} \frac{p_{fa,i}}{T_i}\right\} T_j \quad (7\text{-}8)$$

where $$T_j, \frac{1}{T_{ej}},$$

$p_{ss,j}$, $\mu_i$, $R_j$ and $p_{fa,j}$ comprise the analytical performance parameters, where $N_s$ stands for the number of sensors in the system, and where the subscript j stands for joint;
using the analytical performance parameters for analysis of the sensor system's performance.

2. The method according to claim 1, wherein probabilities for different events that concern a tracking procedure are calculated by using a calculated measurement rate, $$\frac{1}{T_j},$$

the detection probability, $p_{ss,j}$ and the probability of false alarms, $p_{fa,j}$, for the sensor system together with Markov analysis.

3. The method according to claim 1, wherein a filter for the sensor system is calculated by using a calculated effective measurement rate, $$\frac{1}{T_{ej}},$$

for the system.

4. The method according to claim 3, wherein:
   the expressions are used to calculate the sensor system's measurement characteristics in order to calculate with a filter the sensor system's tracking performance for tracking measured objects;
   the filter for the system gives a covariant matrix, P, which is read off as a covariance matrix that gives the tracking accuracy of the sensor system at each point in a given area.

5. The method according to claim 3, wherein the sensor system's stationary characteristics are calculated by a filter's stationary state being calculated at each point over a given area, which calculation comprises the expression.

6. The method according to claim 3, wherein the sensor system's dynamic characteristics are calculated by a filter being calculated based on parallel target paths of a target with given values of speed and course, which calculation also comprises the expression.

7. The method according to claim 1, wherein an adaptive sensor is regarded as a sensor system.

8. A device for analytical calculation of a sensor system's performance, the sensor system comprising $N_S$ sensors, the device comprising:
   means for combining performance parameters in the form of measurement characteristics from the respective sensors, the performance parameters comprising:
      $p_{ss,j}$=a detection probability per scan for targets with a particular target area for the sensor $N_S$=i;
      $R_i$=mearsurement accuracy expresses as a covariance matrix for the sensor $N_S$=i;
      $T_i$=searching time for a search area for the sensor $N_S$=i, and;
      $p_{fa,j}$=a probability of false alarms for a sensor $N_s$=i;
   means for fusing the performance parameters by weighting measurement contributions of the respective said sensorsr;
   means for calculating analytical performance parameters for the sensor system, independently of different measurement characteristics of the sensors in the system the calculating of the analytical performance parameters including evaluating the following expression:

$$T_j = \left(\sum_{i=1}^{N_S} T_i^{-1}\right)^{-1} \quad (7\text{-}2)$$

$$\frac{1}{T_{ej}} = \sum_{i=1}^{N_S} \frac{p_{ss,i}}{T_i} \quad (7\text{-}3)$$

$$p_{ss,j} = \frac{T_j}{T_{ej}}, \quad (7\text{-}4)$$

$$\frac{1}{T_{ei}} = \frac{p_{ss,i}}{T_i} \quad (7\text{-}5)$$

$$\mu_i = \frac{T_{ej}}{T_{ei}} \quad (7\text{-}6)$$

$$R_j = \left\{\sum_{i=1}^{N_S} \mu_i R_i^{-1}\right\}^{-1} \quad (7\text{-}7)$$

$$p_{fa,j} = \left\{\sum_{i=1}^{N_S} \frac{p_{fa,i}}{T_i}\right\} T_j \quad (7\text{-}8)$$

where $$T_j, \frac{1}{T_{ej}},$$

$p_{ss,j}, \mu_i, R_i$ and $p_{fa,i}$ comprised the analyticcal performance parameters, where $N_S$ stands for the number of sensors in the system, and where the subscript j stands for joint; and
   means for using the analytical performance parameters for analysis of the sensor systems's performance.

9. The device according to claim 8, further comprising means for calculating a filter's stationary state at each point over a given area.

10. The device according to claim 8, further comprising means for calculating a filter's dynamic characteristics on the basis of parallel target paths for a target with given values for speed and course.

11. The device according to claim 8, wherein at least one of the sensors in the sensor system is a passive sensor.

12. The device according to claim 8, wherein at least one of the sensors in the sensor system is an active sensor.

13. The device according to claim 8, wherein at least one of the sensors in the sensor system is an adaptive sensor.

14. The device according to claim 8, wherein at least one of the sensors in the sensor system is a radar unit.

15. A computer program product comprising instructions stored on computer-readable memory which, when executed perform the steps of:
   obtaining performance parameters from $N_S$ sensors that are in a sensor system, the performance parameters comprising:
      $p_{ss,i}$=a detection probability per scan for targets with a particular target area for the sensor $N_{S=i}$;
      $R_i$=measurement accuracy expressed as a covariance matrix for the sensor $N_S$=i;
      $T_i$=searching time for a search area for the sensor $N_S$=i, and:
      $P_{fa,i}$=a probability of false alarms for a sensor $N_S$=i;
   calculating a set of analytical performance parameters for the system using the performance parameters being fused, the calculating of the analytical performance parameters being performed irrespective of different measurement characteristics of the sensors in the system, the calculating of the analytical performance parameters including evaluating the following expressions:

$$T_j = \left(\sum_{i=1}^{N_S} T_i^{-1}\right)^{-1} \quad (7\text{-}2)$$

$$\frac{1}{T_{ej}} = \sum_{i=1}^{N_S} \frac{p_{ss,i}}{T_i} \quad (7\text{-}3)$$

$$p_{ss,j} = \frac{T_j}{T_{ej}}, \quad (7\text{-}4)$$

$$\frac{1}{T_{ei}} = \frac{p_{ss,i}}{T_i} \quad (7\text{-}5)$$

$$\mu_i = \frac{T_{ej}}{T_{ei}} \quad (7\text{-}6)$$

$$R_j = \left\{\sum_{i=1}^{N_S} \mu_i R_i^{-1}\right\}^{-1} \quad (7\text{-}7)$$

$$p_{fa,j} = \left\{\sum_{i=1}^{N_S} \frac{p_{fa,i}}{T_i}\right\} T_j \quad (7\text{-}8)$$

where $$T_j, \frac{1}{T_{ej}},$$

$p_{ss,j}$, $\mu_i$, $R_j$ and $p_{fa,j}$ comprise the analytical performance parameters, where $N_S$ stands for the number of sensors in the system, and where the subscript j stands for joint.

* * * * *

UNITED STATES PATENT AND TRADEMARK OFFICE
CERTIFICATE OF CORRECTION

PATENT NO. : 7,167,810 B2
APPLICATION NO. : 10/485806
DATED : January 23, 2007
INVENTOR(S) : Kronhamn et al.

It is certified that error appears in the above-identified patent and that said Letters Patent is hereby corrected as shown below:

In Column 6, Line 39, delete "senors'" and insert -- sensors' --, therefor.

In Column 8, Line 67, after "read in" insert -- Kronhamn T.R., "Surveillance Performance", Radar '95, IEEE International Radar --.

In Column 9, Line 36, delete ""task"" and insert -- "tasks" --, therefor.

In Column 10, Line 6, after paragraph ending with "capacity at the given location?"." insert paragraph -- Another example of how the technology can be used is when there are mobile sensors in the system, which, on account of their mobility, affect the performance of the system depending upon their position in relation to other sensors. In this case, the technology can respond to whether the mobile sensor can be allowed to move in the required way, or whether the mobile sensor needs to be redirected in order to strengthen the sensor system's characteristics at a particular point or in a particular geographical area. --.

In Column 10, Line 23, after paragraph ending with "in the sensor area." insert -- ALTERNATIVE EMBODIMENTS --.

In Column 10, Lines 50-56, delete paragraph "An additional advantage of the method according to the technology using fusion of performance parameters as above for calculating analytical performance parameter for a system is obtained with adaptive sensors, each of which can be regarded as a sensor system. An adaptive sensor can thus be regarded as several different sensors, depending upon how the adaptive sensor is adjusted.".

In Column 15, Line 54, in Claim 1, delete "$p_{ss,j}$" and insert -- $p_{ss,i}$ --, therefor.

In Column 15, Line 56, in Claim 1, delete "$R_j$" and insert -- $R_i$ --, therefor.

In Column 15, Line 58, in Claim 1, delete "$T_j$" and insert -- $T_i$ --, therefor.

In Column 15, Line 60, in Claim 1, delete "$P_{fa,j}$" and insert -- $P_{fa,i}$ --, therefor.

In Column 15, Line 62, in Claim 1, delete "paramaeters" and insert -- parameters --, therefor.

UNITED STATES PATENT AND TRADEMARK OFFICE
CERTIFICATE OF CORRECTION

PATENT NO.         : 7,167,810 B2
APPLICATION NO.    : 10/485806
DATED              : January 23, 2007
INVENTOR(S)        : Kronhamn et al.

It is certified that error appears in the above-identified patent and that said Letters Patent is hereby corrected as shown below:

In Column 15, Line 65, in Claim 1, delete "charictaristics" and insert -- characteristics --, therefor.

In Column 17, Line 15, in Claim 8, delete "$p_{ss,j}$" and insert -- $p_{ss,i}$ --, therefor.

In Column 17, Line 17, in Claim 8, delete "mearsurement" and insert -- measurement --, therefor.

In Column 17, Line 17, in Claim 8, delete "expresses" and insert -- expressed --, therefor.

In Column 17, Line 21, in Claim 8, delete "$p_{fa,j}$" and insert -- $p_{fa,i}$ --, therefor.

In Column 17, Line 24, in Claim 8, delete "sensorsr;" and insert -- sensors; --, therefor.

In Column 17, Line 60, in Claim 8, delete "$R_i$" and insert -- $R_j$ --, therefor.

In Column 17, Line 60, in Claim 8, delete "$p_{fa,i}$" and insert -- $p_{fa,j}$ --, therefor.

In Column 17, Line 60, in Claim 8, delete "analyticcal" and insert -- analytical --, therefor.

In Column 18, Line 19, in Claim 15, delete "$N_{S=i,}$" and insert -- $N_S=i;$ --, therefor.

Signed and Sealed this

Twenty-fifth Day of March, 2008

JON W. DUDAS
*Director of the United States Patent and Trademark Office*